Figure 1:
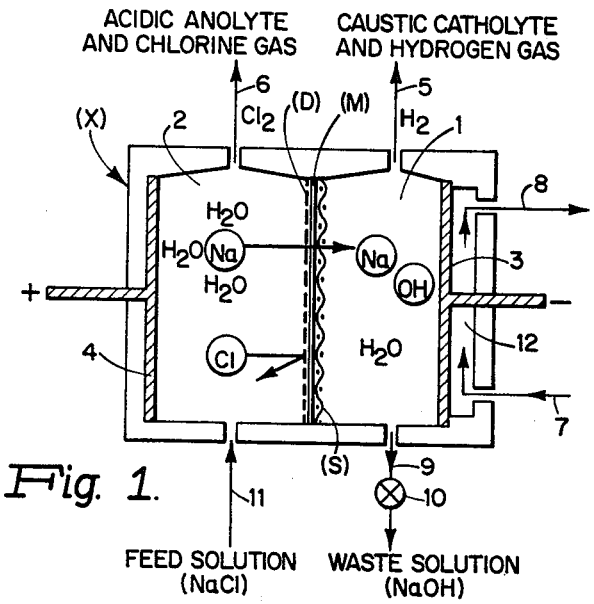

United States Patent
Kirkham et al.

[15] 3,669,857
[45] June 13, 1972

[54] ELECTROLYTIC CHLORINATION AND PH CONTROL OF WATER

[72] Inventors: Thomas A. Kirkham, Lexington; John W. Arnold, Wilmington; Anthony J. Giuffrida, North Andover, all of Mass.

[73] Assignee: Ionics Incorporated, Watertown, Mass.

[22] Filed: July 30, 1970

[21] Appl. No.: 59,636

[52] U.S. Cl..............................204/151, 210/192, 210/169, 204/180 P
[51] Int. Cl. .......................................C02b 1/82, B01k 3/10
[58] Field of Search .....................204/149, 98; 210/192, 169

[56] References Cited

UNITED STATES PATENTS

| | | | |
|---|---|---|---|
| 3,220,941 | 11/1965 | Osborne | 204/98 X |
| 3,390,065 | 6/1968 | Cooper | 204/98 X |
| 3,563,879 | 2/1971 | Richards et al. | 204/272 |

*Primary Examiner*—John H. Mack
*Assistant Examiner*—A. C. Prescott
*Attorney*—Norman E. Saliba and Aaron Tushin

[57] ABSTRACT

A swimming pool water sterilizer and the method involved in the operation are disclosed employing a two electrode compartment electrolytic cell with said compartments being separated by a cation selective membrane. A concentrated alkali metal chloride salt solution is fed to the anode compartment wherein on application of a decomposition voltage there is formed therein essentially chlorine gas and hypochlorous acid. The migration of water from the anode compartment to the cathode compartment as a result of the solvation of the alkali metal ions ($Na^+$) which passes to the cathode compartment through the cation membrane allows the formation of a caustic solution and hydrogen gas within the cathode compartment. The effluents resulting from both compartments are fed into the recirculated pool water for sterilization. The pH of said water can be controlled by discharging to waste any excess basic catholyte at predetermined intervals at pre-set periods of time.

6 Claims, 2 Drawing Figures

INVENTORS
THOMAS A. KIRKHAM
JOHN W. ARNOLD
ANTHONEY J. GIUFFRIDA

BY Norman E. Saliba
ATTORNEY

ELECTROLYTIC CHLORINATION AND PH CONTROL OF WATER

This invention relates to a process and system for continuously sterilizing water and more particularly to the electrolytic production of chlorine for use in the sterilization of swimming pool waters wherein the desired chlorine residual and desired pH level of the water is continuously maintained. The invention is also applicable for disenfecting food processing plants, laundry water, municipal water supplies etc.

Chlorine is a well known disenfectant commonly employed for use in swimming pools and other water supplies for sterilization and for the control of algae. The most common method of treating small swimming pool waters involves the frequent addition of unstable alkaline reacting compounds such as sodium or calcium hypochlorite which on decomposition releases nascent oxygen which is generally considered (See U.S. Pat. No. 3,152,073) the effective sterilizing agent as follows:

$$NaClO \rightarrow NaCl + (O) \quad \text{Reaction (I)}$$

The addition of the hypochlorite which is usually contaminated with hydroxides results in the undesirable side effect of increasing the alkaline content of the water which then necessitates the addition of an acid or acid salt to control the pH level where desired. In this method there is therefor required the necessity for the direct handling of hazardous liquids or solid chemicals with little if any control of the pH of the water. Additionally, the use of calcium hypochlorite will often cause the development of turbidity in the water due to the formation of calcium carbonate.

The direct addition of gaseous chlorine especially in the larger commercial pools is also employed for sterilization but its use must be surrounded by safe guards since the gas is under great pressures in heavy steel tanks and is highly corrosive and toxic. The chemical reaction in the use of gaseous chlorine is believed to be as follows:

$$Cl_2 + H_2O \rightarrow HCl + HClO \quad \text{Reaction (II)}$$

$$HClO \rightarrow HCl + (O) \quad \text{Reaction (III)}$$

Again the nacent oxygen released from the hypochlorous acid is probably the effective sterilizing agent. The direct addition of chlorine gas tends to lower the pH of the water since acid (HCl) is obtained when the gas reacts with water to produce nacent oxygen. Sodium carbonate or other alkaline chemicals must be added to raise the pH within the safe range of between about 7.0 to 7.8 or preferably between 7.2 to 7.6.

The prior art also resorted to the use of an electrolytic cell for producing the required dosages of residual chlorine in the water obtained from the decomposition of chloride salts added directly to the pool water. This method however, was not successful in controlling the pH level but resulted in an increase of pH due to excessive caustic build up in the pool. These electrolytic cells required frequent servicing due to damage often resulting from excessive current densities and excessive cell temperatures.

The above description shows the inherent disadvantages of all the present methods and apparatus used in swimming pool treatment. These disadvantages are overcome by the present novel process and apparatus which functions to maintain the pH level and the chlorine concentration within a predetermined range.

Accordingly, it is a primary object of this invention to provide a electrolytic cell system which decomposes or breaks down an alkali metal halide preferably the chloride salt such as sodium chloride (common salt) to its basic elements and allows these elements to recombine to form a purifying combination of chemical compounds which are then employed to chlorinate swimming pool waters.

It is a further object of this invention to avoid the handling of hazardous chemicals by the use of an inexpensive alkali metal halide salt as the only added chemical in the operation of the electrolytic cell.

It is a further object of this invention to provide electrolytic chlorination of a body of water such as a swimming pool wherein the pH of said water is controlled to a desired level.

A further object is to provide an electrolytic cell in the system that separately generates acidic chlorine solution and basic caustic separately and then combines them in the proper proportion to maintain the desired pH of a body of water.

It is a further object of this invention to provide means for controlling the injection of chlorine and caustic into a body of water whereby the chlorine residual and the pH of the water is maintained at the desired levels without requiring the addition of adjusting chemicals.

A further object is to provide separate control of the rate and quantity of available acidic chlorine solution and basic caustic generated in the electrolytic cell of the system.

It is still another object of this invention to provide an inexpensive swimming pool water sterilizer and conditioner which is designed for efficient and substantially maintenance-free operation.

Figure 2:
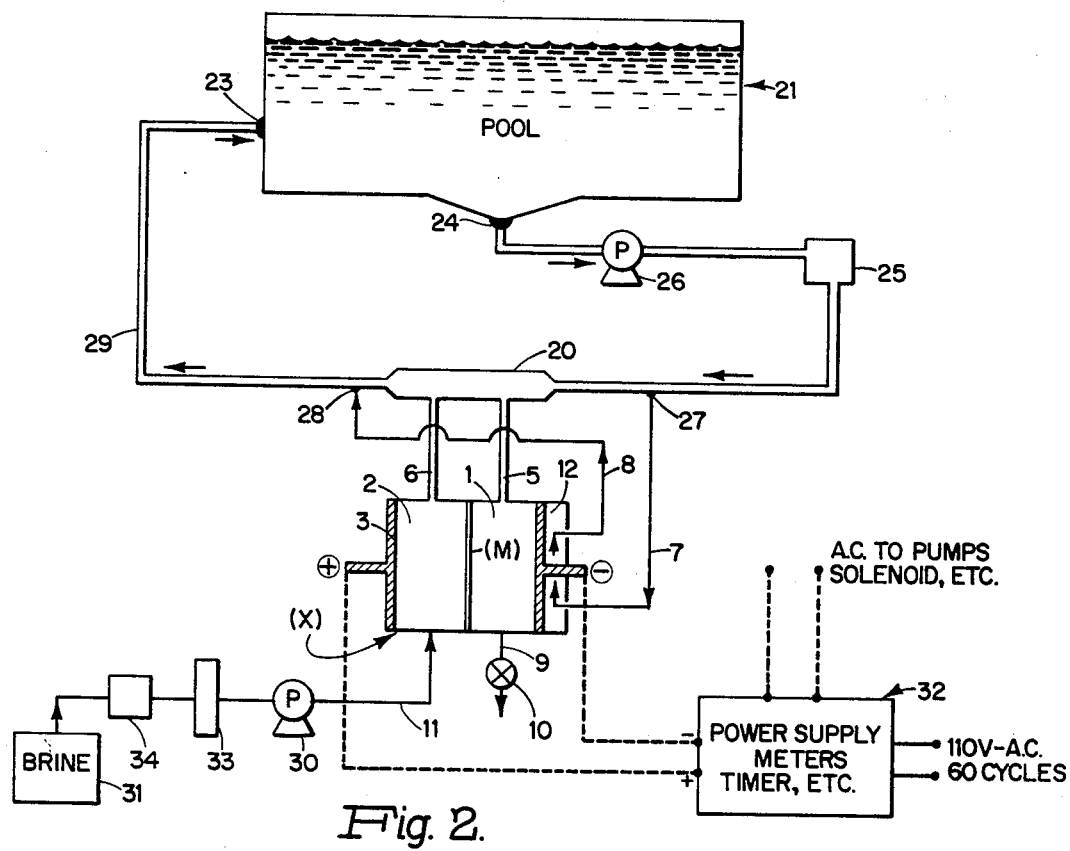

A better understanding of the present invention may be obtained by the appended drawings in which:

FIG. 1 is a diagramatic, vertical cross-section representation of one embodiment of electrolytic cell; and FIG. 2 is a schematic illustration of a preferred swimming pool water purification system which incorporates the electrolytic cell of FIG. 1.

Referring to the drawings in detail the electrolytic cell (X) of FIG. 1, (which is used in the system of FIG. 2 and so designated with like numerals) is shown to be divided into a cathode and an anode compartment 1 and 2. Preferably a porous diaphragm (D) formed of a substantially acid and chlorine resistant material such as Teflon is secured adjacent to the substantially non-porous ion-exchange membrane (M) to protect the latter from deleterious products of the anode reactions. A chemically resistant plastic screen (S) may also be placed in direct contact with the cathode side of the membrane to give support thereto against increased pressure originating from the anode compartment. It is contemplated that a further embodiment of the cell would employ a microporous diaphragm such as polypropylene, asbestos etc. in place of the cation membrane although the efficiency of the cell would suffer by such a substitution. The introduction for example of saturated brine ($Na^+Cl^-$) at feed inlet 11 into anode compartment 2 and the application of a decomposition potential across the electrodes (cathode 3 and anode 4) results in an electrochemical reaction. In such a reaction the sodium ion ($Na^+$) migrates through the cation selective membrane (M) to form sodium hydroxide by combining with the $OH^-$ ion which remains in the cathode compartment 1 when hydrogen gas is released by the cathodic reaction.

The cation membrane employed is preferably of the type containing carboxylic active groups as fully described in U.S. Pat. No. 2,731,408. Cation exchange membranes which depend upon a carboxyl group for their activity are prepared by forming insoluble polymers, co-polymers, or heteropolymers, of an unsaturated carboxyl containing compound or the equivalent thereof. If the starting materials are carboxylic acids, the functional groups of the acid are obtained in the acid form. If an acid anhydride is used, acid groups are readily formed by reaction of the resin with water. Ester groups can be hydrolyzed or saponified to yield resins with free carboxylic groups. Salt forms can be converted to the carboxyl forms by treatment of the resin in the salt form with an acid solution. A specific type of a carboxylic exchanger is prepared by heteropolymerizing maleic anhydride or fumaric acid with styrene together with a cross-linking agent such as divinylbenzene. Other particularly useful starting materials for preparing carboxylic resins are acrylic acid and methacrylic acid. If these materials are polymerized into an insoluble form, the resulting products are of high capacity. The aforesaid acids may also be co-polymerized with polyunsaturated polymerizable compounds such as divinylbenzene, trivinylbenzene, ethylene diacrylate, or dimethylacrylate, diallyl maleate or fumarate to yield insoluble carboxylic resins effective as cation exchangers. Additionally, phenolic sulfonic acid, polystyrene sulfonic acid, or polystyrene sulfonic acid containing activated hydroxyl groups can be used in the preparation of cation exchange membranes for use in the present invention.

It is to be noted that during cell operation sufficient water will be transferred with $Na^+$ through the cation membrane from compartment 2 into compartment 1 to form the catholyte of sodium hydroxide. This water transfer which is inherently associated with ion transport results from two causes: (1) since all ions are more or less hydrated, water transport is inherent in the transfer of ions; and (2) since the membrane contains a fixed charge, there is an endosmotic water transfer under the influence of an imposed DC potential across the membrane. No other water is supplied to said cathode compartment 1 from any other source during the operation of the electrolytic cell. The chloride ion ($Cl^-$) in the anolyte is substantially excluded from entering the cathode compartment 1 by the cation selective membrane (M) as shown by the arrow in the drawing. The anodic action forms chlorine gas ($Cl_2$) which reacts with water to form hypochlorous acid (HClO) in the anode compartment 2 as shown by reaction (II). A porous sheet of Teflon, (trademark) protects the membrane from the deleterious effects of the chlorine gas. By cathodic action the generation of the hydrogen gas ($H_2$) in the cathode compartment produces a positive pressure resulting in the displacement of the caustic catholyte (NaOH) out at the top of the cell through conduit 5. Similarly, in anode compartment 2, the evolved chlorine gas also displaces the anolyte of hypochlorous acid and unused brine through conduit 6. When the anolyte and catholyte mix the dissolved chlorine and free chlorine gas react with the caustic to form hypochlorites.

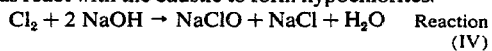
$$Cl_2 + 2\ NaOH \rightarrow NaClO + NaCl + H_2O \quad \text{Reaction (IV)}$$

In addition at least a portion of the caustic catholyte in compartment 1, is removed or drained through waste conduit 9 at controlled preset time intervals from the said cathode compartment through a solenoid operated valve 10 which operation will be described in more detail hereinafter. During operation of the electrolytic cell both electrodes (but especially the cathode because of its low water intake) will generate heat and the cell becomes quite warm. In order to function efficiently and to prevent cell damage, necessary cooling is provided by passing a cooling fluid such as water through a confined area or chamber 12 associated with the back side of the cathode 3 through liquid cooling inlet and outlets 7 and 8, respectively. The cooling may also be effected, for example, by passing a coolant through a coil located directly in the cell compartments. The anode electrode may also be cooled in the same manner as described for the cathode if so desired.

Correlation of the described electrolytic cell of FIG. 1 into the complete system for treating swimming pool water is shown in FIG. 2 which will now be described in detail.

Attached to the two upper located outlet conduits 5 and 6 of the electrolytic cell of FIG. 1 is a mixing area, zone or chamber 20 through which the water from swimming pool 21 recirculates through conduit 29 between pool inlet and outlets 23–24 by means of a pump 26, through filter 25, through the mixing area 20, and back to the swimming pool 21.

The circulation of the cooling water for the cathode 3 of the electrolytic cell is most expeditiously effected by use of the pool water flowing from take-off point 27 through cooling inlet pipe 7 and into return entry point 28 from cooling outlet pipe 8. Conduits 5 and 6 located at the upper sections of the cell are preferably made of tubular plastic materials such as Teflon having, for example an inside diameter of between one-eighth to one-fourth inch but preferably about three-sixteenths inch. This diameter size was found ideal where the circulating pool water flow rate would average (as in the case of a medium size swimming pool) between 20 and 25 gal/min. It was also unexpectedly found that the length of the conduit tubes 5 and 6 was also critical for proper operation of conveying the gases and fluids from the electrode compartments into the mixing area 20. It was determined that their lengths should be at least about 6 inches and preferably from about 9 to 12 inches. The reasons for this criticality is not clear but it is found that when the tube lengths are shorter than about 6 inches the gases and cell fluids would often recede back into the electrode compartments accompanied by the entry and mixing with pool water. It would also be apparent that this length dimension will vary with the internal diameter size of the conduit tubes, the current density, pump pressure, water recirculation rates etc. and obviously variations in these parameters are to be expected in accordance with the volume of the swimming pool water being treated. Provision is also made during cell shut-down periods to drain at least a portion of the caustic catholyte preferably from the bottom of the cathode compartment 1 via conduit 9, through selenoid valve 10; the opening and closing of this valve being controlled by a timer located in power box 32. This automatic draining of caustic solution provides the novel means for controlling the pH level of the swimming pool water since the injection into the water of the entire electrolytic cell effluent products would result in increasing the pH level of the pool water due to the gradual build-up of excess caustic solution therein necessitating acid addition as noted hereinabove. This pH build-up has been proved true with all previous types of electrolytic cells used for sterilizing swimming pool water. However, the present invention using periodic draining of the catholyte content during predetermined shut-down periods results in the pH of the swimming pool being held substantially constant. This present system which permits the controlled splitting of the products of salt electrolysis and a withdrawal of a percentage of the caustic produced to waste provides a means of accurately controlling and maintaining the pH of the swimming pool water at any desired level. The power box 32 contains the power supply, meters and the timer controlling the solenoid valve 10 for withdrawing at set intervals (such as once each day) at least part of the caustic contents of the cathode compartment as referred to above. The power supply (110 V, AC input) supplies a fixed rectified DC voltage output to the electrolytic cell as well as AC current for the pumps, timer etc. used in the operation of the system. The saturated brine solution in salt reservoir 31 is passed by pumping means 30 through a filter 34 and a flow metering device 33 at a predetermined rate into the anode compartment 2 of the electrolytic cell. AC power for pump operation is supplied from the power supply and hence, ensures delivery of brine to the anode compartment when a DC potential is applied to the cell. The solenoid valve 10 on the caustic solution outlet located ideally at the lower section of the cathode compartment permits extraction of pre-set volumes of caustic at predetermined time intervals as controlled by the timer. As detailed above, the extraction of a percentage of the caustic produced at the cathode permits absolute control of the pH of the pool water into which the electrolytic cell products are injected. The frequency of extraction of caustic via the solenoid valve 10 which is preferably located at the bottom of the cell can be readily determined and is most expeditiously effected during night time shut-downs. The electrolytic cell operates only when the pool water recirculation pump is operating which means that it will be started and stopped at least once a day. The following example will serve to illustrate the actual operation of the present invention but is not meant to limit the invention thereto.

A sterilization system was constructed essentially in accordance with that illustrated in FIG. 2. The electrolytic cell constructed of two plastic halves had outside dimensions of approximately 7×7×4 inches for treating a swimming pool containing from about 17,000 to 20,000 gallons capacity. The electrodes located in the plastic end plates were circular in cross section, 4 inches in diameter and spaced about 2 1/8 inches apart from each other. The anode was constructed of platinized titanium as described in U.S. Pat. No. 3,117,023 and the cathode of stainless steel. The homogeneous cation selective membrane was of the preferred carboxylic type such as disclosed in U.S. Pat. No. 2,731,408. Such membranes as previously stated comprise copolymers of polyvinyl aromatic compounds and olefinic carboxyl monomers although other type cation membranes well known in the art may still be employed. A protective sheet of tightly woven but porous Teflon cloth was placed adjacent to said membrane on the anode side and a plastic screen on the cathode side. The feed solution to the anode compartment was a saturated solution of common salt amounting to about 0.65 gallons per day or 1.7 lbs salt per day of which about 50 percent of this salt was consumed in the electrochemical reaction with current efficiencies in the 75 percent range. The direct electric current supplied to the cell averaged about 8 amperes with an average cell voltage maintained at about 6 volts. The swimming pool water recirculation pipe was 1 ¼ inches in diameter and the mixing area or chamber portion about 2 inches in diameter. The outlet conduits or tubes from the top portion of the anode and cathode compartments were made of Teflon (trademark) having an inside diameter of three-sixteenths inch, and a length of about 10 inches and extended from the top of the electrolytic cell to the recirculating pool water conduit (mixing zone or chamber) with said water being recirculated at about 20–25 gals per minute.

The system operated daily from about 3 hours in the winter time to from about 12 to almost 24 hours in the summer time. The cell supplied an average of about 0.4 lbs of chlorine per day with the pH of the pool water varying from 7.2 to 7.8. The control of this pH was effected by the timer which operated the solenoid valve to allow discharge of catholyte from the cathode chamber for about 10–30 seconds each day conviently during a night shut-down time depending on the measured acidity of the pool water. This system which operated for one year gave excellent results and produced clean sterile water at comfortable water acidities and with complete lack of algae infestation.

While particular embodiments of the present invention have been described, it will be obvious to those skilled in the art that changes and modifications may be made without departing from the invention in its broader aspects, and therefore, the aim in the appended claims is to cover all such changes and modifications as come within the true spirit and scope of this invention.

The embodiments of the invention in which an exclusive property or privilege is claimed are defined as follows:

1. A system for chlorinating and controlling the pH of swimming pool water; the pool having water inlet and outlet means connected to a water recirculation conduit having pumping means in association therewith for effecting flow of pool water therethrough comprising:
   a. an electrolytic cell having a cation permselective membrane separating the cell into a cathode and anode compartment containing, respectively, a cathode and anode electrode therein, with at least one of said electrode compartments being associated with cooling means for removing heat therefrom;
   b. a salt feed conduit connecting a salt solution source means to said anode compartment and pumping means for introducing said salt solution into contact with said anode to form the anolyte solution;
   c. said cathode compartment having a discharge conduit in association with valve means, said valve means connected to timer means for controlling the opening and closing of said discharge conduit at pre-set desired time intervals for withdrawing caustic catholyte therefrom;
   d. a mixing zone or area section spaced above the top level of the electrolytic cell and interposed in the pool water recirculating conduit;
   e. gas-liquid conduit means originating from the upper portion of each of said anode and cathode compartments and in communication with said mixing zone or area section for discharging gases and catholyte and anolyte liquids into said zone,
   f. power supply means for passing a direct current through the electrodes of said cell, and current means for operating the said pumping and timer means.

2. The system of claim 1 wherein the mixing zone section is substantially larger in cross section than the pool recirculating conduit.

3. The system of claim 1 wherein at least the side of said cation selective membrane facing the anode is protected from attack by the products of the anodic reaction by a porous, substantially inert diaphragm in contact therewith.

4. The system of claim 1 wherein said cooling means comprise a confined space located in the wall of said cell and in association with the back side of an electrode, said space being in communication with means for circulating a cooling fluid therethrough.

5. The system of claim 4 wherein the cooling fluid is water obtained through conduit means communicating with the said pool water recirculation conduit.

6. The system of claim 1 wherein the said gas-liquid conduit tubes measure internally about three-sixteenth inch in diameter and between 9 to 12 inches in length.

* * * * *